_United States Patent_ [19]

Aoyagi et al.

[11] Patent Number: 5,086,678
[45] Date of Patent: Feb. 11, 1992

[54] WORKPIECE CONVEYING METHOD AND DEVICE FOR A CUTTING MACHINE

[75] Inventors: Minoru Aoyagi; Takayoshi Hasegawa, both of Hadano, Japan

[73] Assignee: Amada Company, Limited, Japan

[21] Appl. No.: 440,313

[22] Filed: Nov. 22, 1989

[30] Foreign Application Priority Data

Nov. 22, 1988 [JP] Japan .................................. 63-293576
Feb. 9, 1989 [JP] Japan ...................................... 1-28690

[51] Int. Cl.$^5$ ............................................ B65G 47/74
[52] U.S. Cl. ........................................... 83/13; 83/158; 83/436; 198/803.14
[58] Field of Search .................. 83/158, 279, 280, 436, 83/13; 198/346.2, 720, 803.14

[56] References Cited

U.S. PATENT DOCUMENTS

| | | | |
|---|---|---|---|
| 3,895,723 | 7/1975 | Stolzer | 414/745 |
| 4,024,948 | 5/1977 | Persson | 198/803.14 |
| 4,283,974 | 8/1981 | Kline | 83/42 |
| 4,737,068 | 4/1988 | Mochizuki | 414/745 |
| 4,867,297 | 9/1989 | Saitoh et al. | 198/346.2 |

FOREIGN PATENT DOCUMENTS

| | | |
|---|---|---|
| 8704412 | 7/1987 | PCT Int'l Appl. |
| 1266051 | 3/1972 | United Kingdom . |
| 1436293 | 5/1976 | United Kingdom . |
| 2176452 | 5/1986 | United Kingdom . |

_Primary Examiner_—Mark Rosenbaum
_Assistant Examiner_—John M. Husar
_Attorney, Agent, or Firm_—Wigman & Cohen

[57] ABSTRACT

A method for conveying a long workpiece to a cutting machine includes the steps of conveying a long workpiece laterally to a feed conveyor positioned in parallel with the path line of the cutting machine by a cross conveyor extending in the lateral direction of the workpiece; stopping the cross conveyor when a workpiece reaches a regulating member provided above the cross conveyor, in a line parallel to the path line of the cutting machine; moving the feed conveyor with respect to the cutting machine path line in response to the workpiece width so that the feed conveyor is located at a position for selectively scooping up the workpiece; moving at least one of the feed conveyor or the cross conveyor in the vertical direction so that the workpiece is selectively loaded on the feed conveyor; and conveying the loaded workpiece to the cutting machine by the feed conveyor. A workpiece conveying device for conveying a long workpiece to a cutting machine, includes a cross conveyor for conveying the workpiece laterally to the direction normal to the cutting machine path line; a regulating member for regulating the position of the workpiece in alignment with the cutting machine path line; a feed conveyor disposed parallel to the cutting machine path line; a position adjusting means for adjusting the position of the feed conveyor in the lateral direction; and a vertical operating device for moving a part of the cross conveyor in the vertical direction.

12 Claims, 9 Drawing Sheets

WORKPIECE CONVEYING METHOD AND DEVICE FOR A CUTTING MACHINE

BACKGROUND OF THE INVENTION

1. Field of the Invention

The present invention relates to a method and device for conveying a long workpiece such as a bar to a cutting machine such as, for example, a disc cutter, a circular saw machine, or a band saw machine, and the like, and, in particular, to a method and device for selecting, for example, a single workpiece from a plurality of workpieces, and conveying the selected workpiece to the cutting machine.

2. Description of the Prior Art

Commonly known cutting machines which automatically cut a long workpiece, such as a bar, to a suitable length, include disc cutters, circular saw machines, band saw machines, and the like.

In order to feed the long workpiece to the cutting machine automatically a feed conveyor is provided at the rear of the cutting machine; the feed conveyor feeds the workpiece in the longitudinal direction thereof. Also, a cross conveyor, on which a plurality of parallel workpieces is loaded, is positioned beside the feed conveyor. The workpieces on the cross conveyor are transferred to the region of the feed conveyor through the cross conveying action of the cross conveyor.

Conventionally, the cross conveyor is fabricated as an endless chain and is positioned only on one of the right or left side of the feed conveyor. A plurality of divider pins is provided on the cross conveyor, embedded at positions equally spaced to correspond to the maximum diameter of the workpieces to be loaded.

Accordingly, the number of workpieces which can be loaded onto the cross conveyor is limited by the number of loading regions into which the cross conveyor is divided by the divider pins. This causes the problem for example, that when the loading region is fully loaded with workpieces of a small diameter, there is a considerable amount of wasted space.

There is also the problem that, conventionally, it is difficult to select and cut the workpieces loaded on the cross conveyor.

SUMMARY OF THE INVENTION

A first object of the present invention is to provide, with due consideration to the drawbacks of such conventional devices, a method and device to select, for example, a single workpiece from a plurality of workpieces of different diameters loaded in parallel and in mutual contact on the cross conveyor, and to load each workpiece onto the feed conveyor.

This first object is achieved in the present invention by the provision of a configuration wherein the workpieces which are transferred to the region of a feed conveyor by the transfer action of a cross conveyor, are separated from the others, and wherein the separated one is loaded onto the feed conveyor.

By means of the present invention, it is possible to load many workpieces on the cross conveyor in a manner such that they are in mutual contact thereon.

A second object of the present invention is to provide a method and device by which it is possible to select a particular workpiece from the plurality of workpieces loaded onto the cross conveyor, and feed it to a cutting machine.

This second object is achieved in the present invention by the provision of a configuration wherein a cross conveyor is provided extending from one side of a feed conveyor to the other, and when the desired workpiece is transferred to the region of the feed conveyor from the cross conveyor, the desired workpiece can be elevated relative to the feed conveyor and loaded onto the feed conveyor.

By means of the present invention, it is possible to feed a particular workpiece on the cross conveyor to the cutting machine and, after cutting, to return the remainder of the workpiece to the cross conveyor.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENTS

Figure 1:
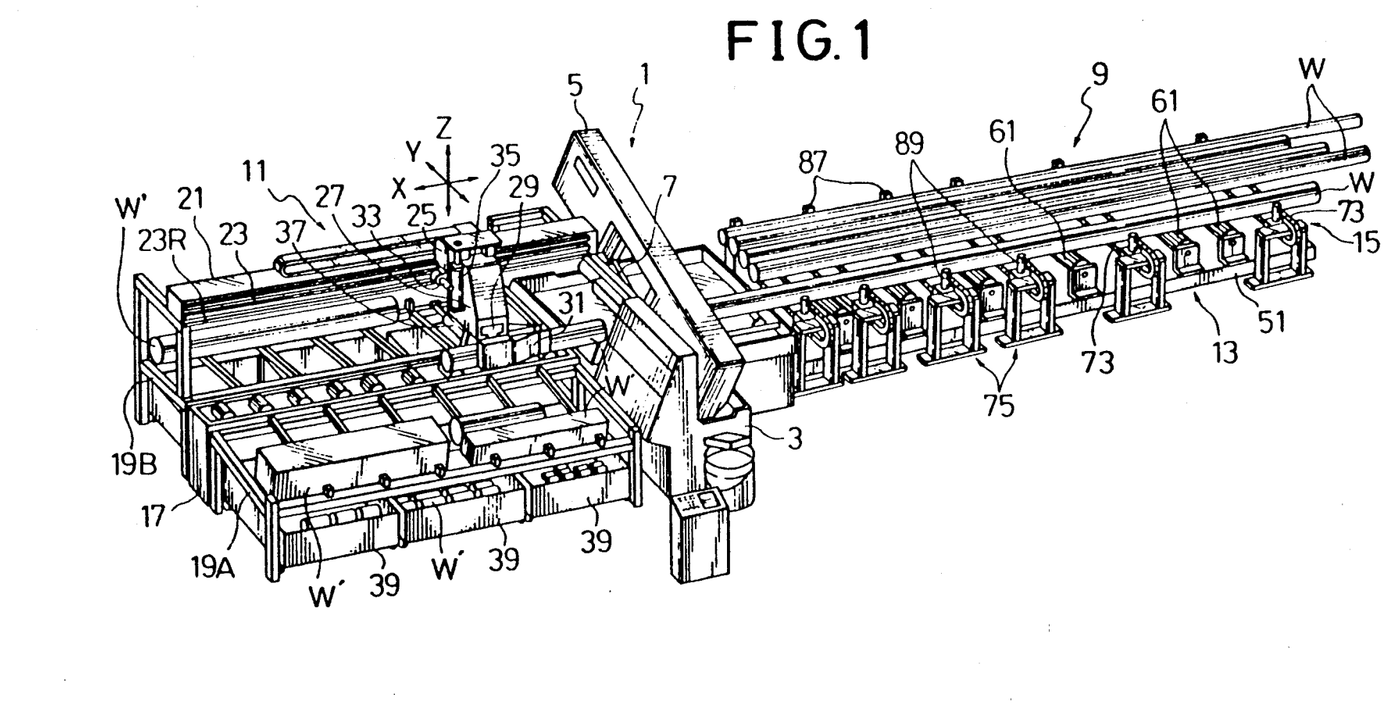
FIG. 1 is a perspective drawing of a first embodiment of the present invention.

Now referring to FIG. 1, in the first embodiment of the present invention, a horizontal band saw machine is shown as an example of a cutting machine 1. The horizontal band saw 1 is provided with a head 5 mounted on a base 3 in a freely vertically movable manner and a band saw blade 7 is provided in the cutting head 5 for cutting a long workpiece W. The configuration is the same as is conventional so a more detailed explanation is omitted here.

A workpiece conveying device 9 which conveys the workpiece W to the cutting machine 1 is positioned on the rear section of the cutting machine 1. A workpiece removal device 11 which removes a cut bar W', which has been cut from the workpiece W in the cutting machine 1, is positioned on the front section of the cutting machine 1.

The workpiece conveying device 9 basically comprises a feed conveyor 13 which conveys the workpiece W toward the cutting machine 1, and a cross conveyor 15 provided at right angles to the feed conveyor 13 to convey the long workpiece W in a direction at right angles to the longitudinal direction of the workpiece W, into the region of the feed conveyor 13. The feed conveyor 13 can be moved vertically relative to the cross conveyer 13 as will be disclosed in detail hereinafter.

Accordingly, in the workpiece conveying device 9, the workpiece W loaded on the cross conveyor 15 can be conveyed to the region of the feed conveyor 13 by the conveying action of the cross conveyor 15. The workpiece W, which has been laterally conveyed into the region of the feed conveyor 13, is pushed up by the elevation of the feed conveyor 13 relative to the cross conveyor 15, so that the pushed up workpiece is separated from the other workpieces W. Then, the separated workpiece is fed toward the cutting machine 1 by the conveying action of the feed conveyor.

The workpiece removal device 11 conveys the cut bar W' which has been cut by cutting machine 1 to a workpiece support table 17 and a pair of inclined shelves 19A, 19B provided in an inclined manner, one on each side of the workpiece support table 17. A detailed drawing has been omitted, but the workpiece removal device 11 comprises an X-axis slider 25 which is movable along a guide rail 23 on a guide base 21 which is provided in the longitudinal direction (X-axis direction) at an upper position of the workpiece support table 17; a Z-axis slider 27 supported on the X-axis slider 25 so as to be movable in the vertical direction (Z-axis direction); a Y-axis slider 29 supported on the Z-axis slider 27 so as to be movable in the lateral direction (Y-axis direction); and a clamp device 31 which is mounted on the Y-axis slider 29 for clamping the cut bar W'.

The X-axis slider 25 is moved in the X-axis direction as the result of the rotation of a pinion (omitted from the drawings) which is provided on a shaft of the motor 33 and engages a rack 23R provided parallel to the guide rail 23. The Z-axis slider 27 and the Y-axis slider 29 are moved by the respective actions of a Z-axis motion cylinder 35 and a Y-axis motion cylinder 37.

As can be readily understood from the foregoing description of this configuration, the cut bars W' cut from the workpiece W can be suitably sorted into different types and removed to the inclined shelves 19A, 19B. The short cut bars W' are dropped into a removable storage box 39 provided in the lower sections of the inclined shelves 19A, 19B.

A more detailed explanation of the relationship between the feed conveyor 13 and the cross conveyor 15 of the workpiece conveying device 9 will now be given. The configuration of the feed conveyor 13 and the cross conveyor 15 is as follows.

Figure 2:
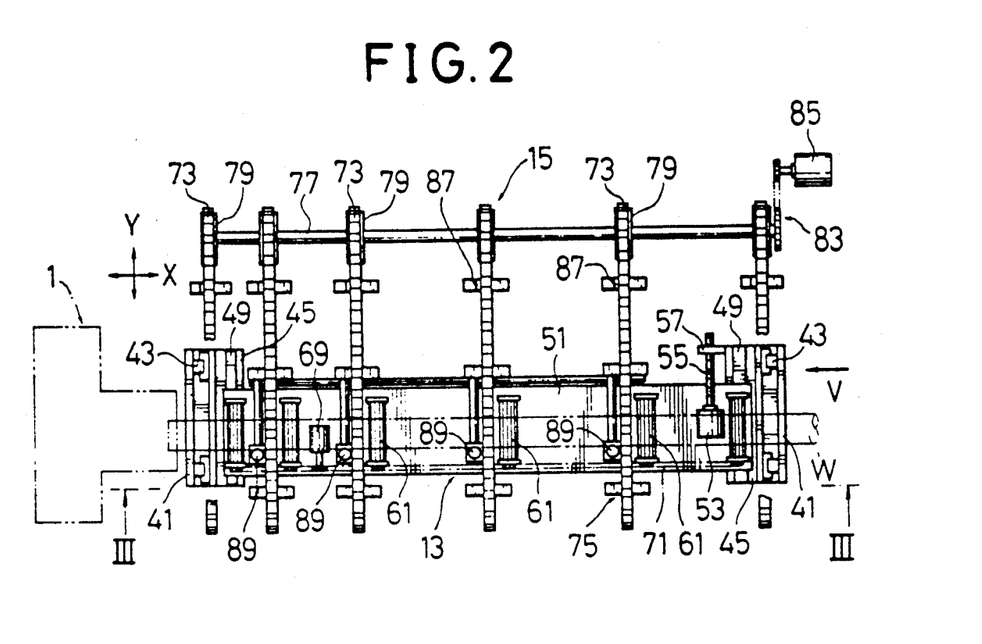
FIG. 2 is a plan drawing of the main parts of FIG. 1.
Figure 3:
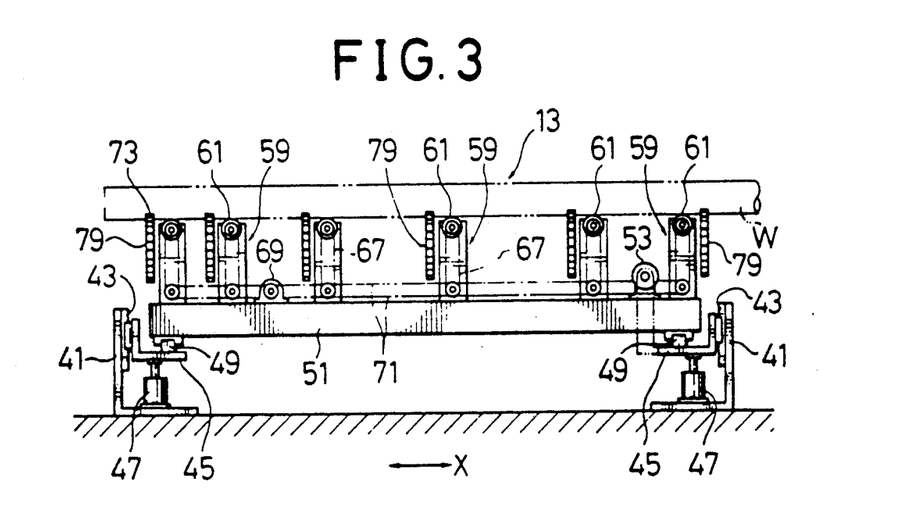
FIG. 3 is a drawing viewed in the direction of the section III—III in FIG. 2.

Referring to FIG. 2 and FIG. 3, the feed conveyor 13 positioned at the rear section of the cutting machine 1 comprises a pair of base pedestals 41 with L-shaped cross sections, positioned close to the rear side and far from the rear side respectively of the cutting machine 1. A pair of elevating pedestals 45 are provided so as to be movable along a guide member 43 provided in the vertical direction on each of the base pedestals 41, and a hydraulic cylinder 47 is provided as an elevating device for elevating each of the elevating pedestals 45. A vertically movable piston rod of the hydraulic cylinder 47 is linked to each elevating pedestal 45.

Further, a Y-axis direction guide member 49 is provided on the elevating pedestal 45, extending in the Y-axis direction. Movably supported on the Y-axis direction guide members 49 are both ends of a conveyor base 51, which extends in the X-axis direction.

A Y-axis motor 53 is mounted at a suitable position on the conveyor base 51 to move the conveyor base along the Y-axis direction guide member 49 A threaded bar 55, which extends in the Y-axis direction and is rotated by the Y-axis motor 53, engages a bracket 57 provided integrally on one of the elevating pedestals 45.

As a result of this configuration, the conveyor base 51 can be moved vertically and horizontally (in the Y-axis direction).

Figure 4:
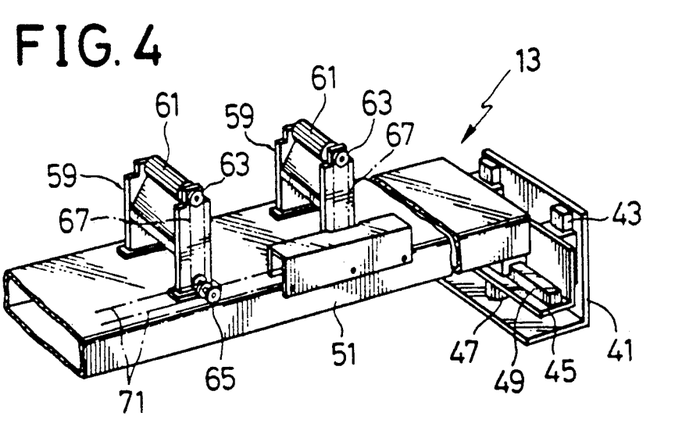
FIG. 4 is a detailed perspective drawing of the main parts of the first embodiment.

As best shown in FIG. 4, a plurality of roller brackets 59 is provided at a suitable spacing on the conveyor base 51. A support roller 61 which supports the workpiece W is rotatably supported on the upper section of each roller bracket 59. A sprocket 63 is provided at the shaft end of each support roller 61, and a chain 67 is installed to run between each sprocket 53 and one sprocket section of a double sprocket 65 provided on the lower section of each roller bracket 59. A drive chain 71 driven by a feed motor 69 (see FIG. 2) mounted on the conveyor base 51 is installed to run between the remaining sprocket sections on the double sprockets 65.

Accordingly, the support rollers 61 are rotatingly driven by the feed motor 69, and when the support rollers 61 are rotated, the workpiece W supported by the support rollers 61 is fed in the longitudinal direction toward the cutting machine 1.

Referring again to FIG. 2 and FIG. 3, the cross conveyor 15 which conveys the long workpiece W to the feed conveyor 13 comprises a plurality of endless chains 73 disposed between the support rollers 61, the endless chains 73 extending in the Y-axis direction at right angles to the direction of the feed conveyor 13.

Figure 5:
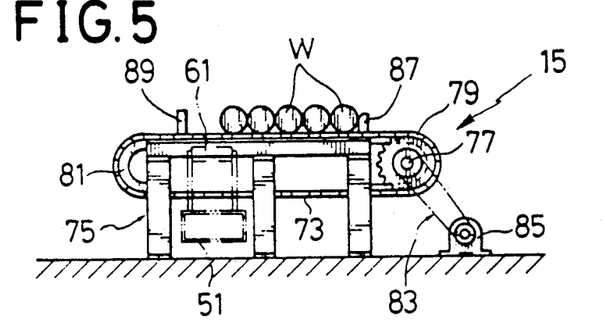
FIG. 5 is an elevation drawing viewed in the direction of the arrow V in FIG. 2.
Figure 6:
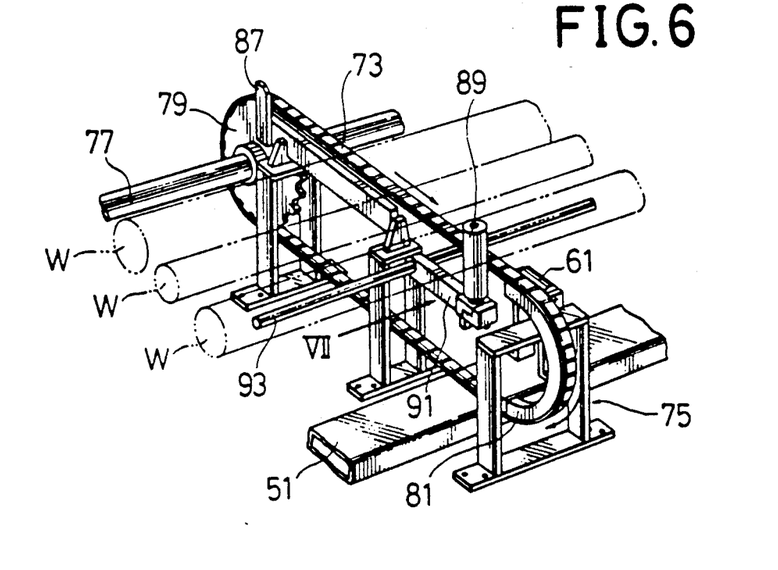
FIG. 6 is a detailed perspective drawing of the main parts of the first embodiment.

As can be understood from FIG. 5 and FIG. 6, each endless chain 73 is supported on a support frame 75 and is positioned to cross the conveyor base 51 of the feed conveyor 13. More specifically, a rotatable shaft 77 extending in the X-axis direction is rotatably supported on one side of the support frame 75. A chain sprocket 79 is installed on the rotatable shaft 77. The endless chain 73 is installed to run between a semicircular chain guide 81 provided on the opposite side of the support frame 75 and the chain sprocket 79. The upper section of the endless chain 73 is arranged at a position slightly higher than that of the support roller 61 of the conveyor base 51 which is descended to the lowermost position. In other words, the support roller 61 can be protruded and retracted with respect to an upper section of the endless chain 73 by the vertical motion of the conveyer base 51. The rotary shaft 77 is connected to a crossfeed motor 85 via a power transmission mechanism 83 comprising a chain and sprocket or the like to drive the endless chain 73. In addition, a stopper 87 is provided on one side of the support frames 75 to prevent the workpiece W from falling off the endless chain 73 in the case where the workpiece W is loaded onto the endless chain 73 by a crane or the like, or in the case where the endless chain 73 is operated in reverse. Also, a regulating member 89 is provided on the other side of the support frames 75; the regulating member 89 regulates the transfer of the workpiece W being transported to the feed conveyor 13 by the cross conveying action of the cross conveyor 15 in the lateral direction, The regulating member 89 is formed from a vertical roller and is erected on the end of a swinging arm 91 which provided on the support arm 75.

Figure 7:
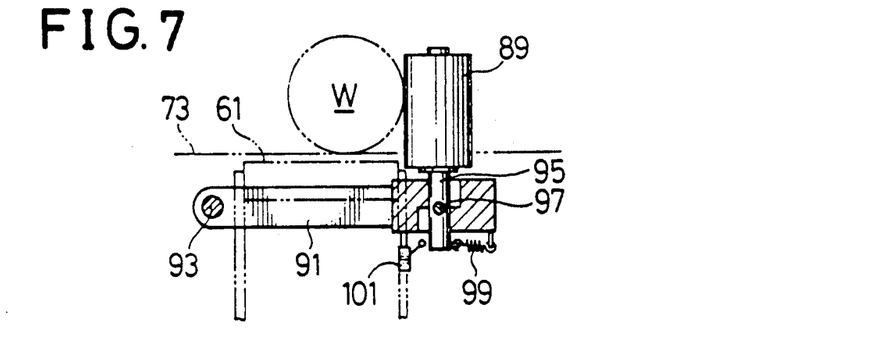
FIG. 7 is a drawing viewed in the direction of the arrow VII in FIG. 6.

More specifically, as can be understood from FIG. 6 and FIG. 7, the swinging arm 91 extends in the Y-direction, parallel to the support roller 61, crossing the conveyor base 51 of the feed conveyor 13. The base of the swinging arm 91 is pivotally supported through a shaft 93 on the support frame 75. The swinging arm 91 is normally energized upwards by a suitable means such as a spring or the like (not shown) so that it is maintained almost horizontally. As shown in FIG. 7, a shaft 95 of the regulating member 89 is provided in an inclinable manner on the end of the swinging arm 91 through a hinge pin 97. A spring 99 which energizes the regulating member 89 vertically is installed under tension between the lower end of the shaft 95 and the tip of the swinging arm 91. A detection device 101, such as a limit switch, is provided on the swinging arm 91 to detect the inclination of the regulating member 89.

In the above configuration, after the long workpieces W are loaded in parallel in cutting sequence extending across the endless chains 73 of the cross conveyor 15, when the crossfeed motor 85 is driven in the forward direction, the workpieces W on the cross conveyor 15 are transferred to the region of the feed conveyor 13. In this way, when the workpiece W is transferred onto the feed conveyor 13 and contacts the regulating member 89, the detection device 101 is activated by the regulating member 89 being pushed to the right in FIG. 7 and inclined.

When the regulating members 89 are inclined and the detection devices are activated, the workpiece W is assumed to be positioned in the region of the feed conveyor 13, parallel to the X-axis, and then the cross transfer of the workpiece W by the cross conveyor 15 is halted. Here, the impact when the workpiece W strikes the regulating member 89 is absorbed by the swinging arm 91 which swings downward in opposition to the energization.

Figure 8A:
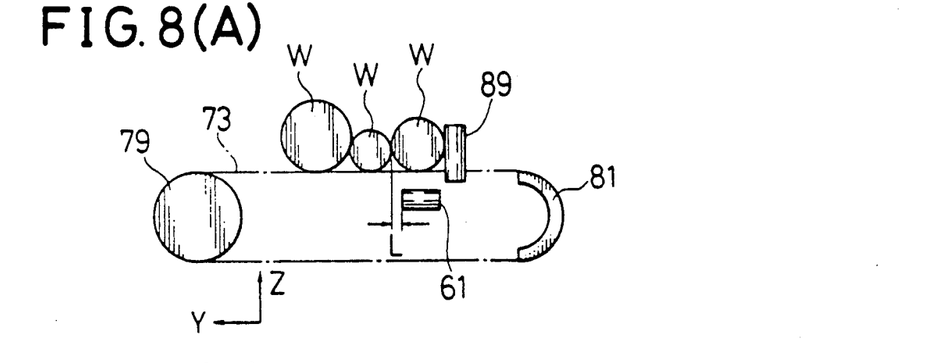
FIG. 8(A) to (C) are explanatory operational drawings of the first embodiment.
Figure 8B:
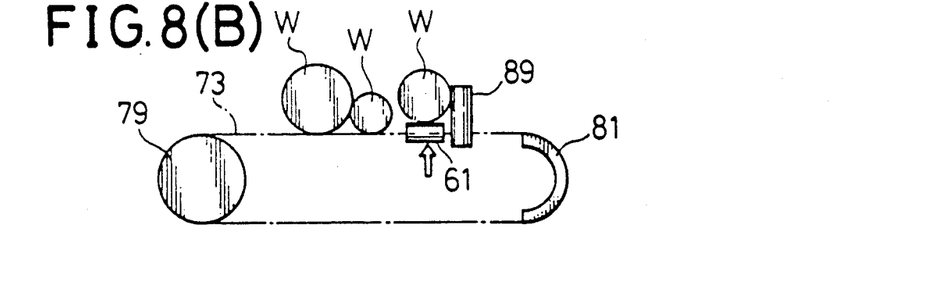
Figure 8C:
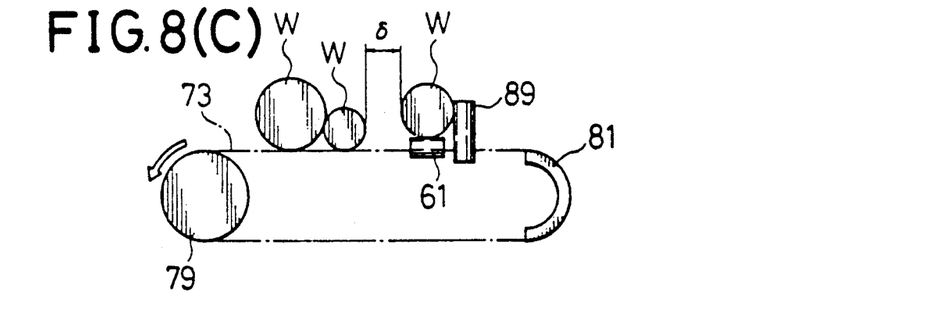

Referring to FIG. 8(A), 8(B) and 8(C), after the cross transfer of the workpiece W by the cross conveyor 15 is halted, the workpiece W is pushed up by the support roller 61 when the conveyor base 51 of the feed conveyor 13 is ascended.

Here, the position of the conveyer base 51 in the Y-axis direction is adjusted so that a space L between one side of the workpiece W and one end of the support roller 61 on the feed conveyor 13 (see FIG. 8(A)) has a suitable value corresponding to the diameter of the workpiece W. Thus, a suitable number (for example, one) of the workpieces W can be securely pushed upward by the support roller 61 (see FIG. 8(B)).

As shown in FIG. 8(C), after the workpiece W for feeding is pushed upward by the support roller 61, the endless chain 73 is reversed slightly, and a space is provided between the workpiece to be fed and the next workpiece, which separates the workpiece so that they are no longer in contact. Following this, the workpiece W is fed to the cutting machine 1 by rotatingly driving the support roller 61 on the feed conveyor 13 and is cut to a suitable length in the cutting machine 1.

Then, the cut bars which are successively cut from the workpiece W are transported to the inclined shelves 19A, 19B by the workpiece removal device 11.

As already explained, by means of the first embodiment of the present invention, the workpieces W can be loaded in parallel so that they are in mutual contact on the endless chain 73 of the cross conveyor 15, and when they are fed by the feed conveyor 13, a single workpiece W, for example, can be reliably taken out from the cross conveyor 15. Specifically, it is possible to effectively utilize the cross conveyor without waste space.

The above-disclosed embodiment of the present invention has the configuration by which the support roller 61 of the feed roller 13 is elevated relative to the endless chain 73 of the cross conveyor 15, but, conversely, it is also possible to have the configuration by which the endless chain 73 is caused to descend relative to the support roller 61.

In addition, in the above-disclosed embodiment, the configuration was explained in which the conveyer base 51 is moved and positioned in Y-axis direction so that the space L between one side of the workpiece W and one end of the support roller 61 (see FIG. 8(A)) has a suitable value corresponding to the diameter of the workpiece W; however it is also possible to have the configuration in which the regulating member 89 is moved and positioned in the Y-axis direction, in accordance with the diameter of the workpiece to be fed.

Figure 9:
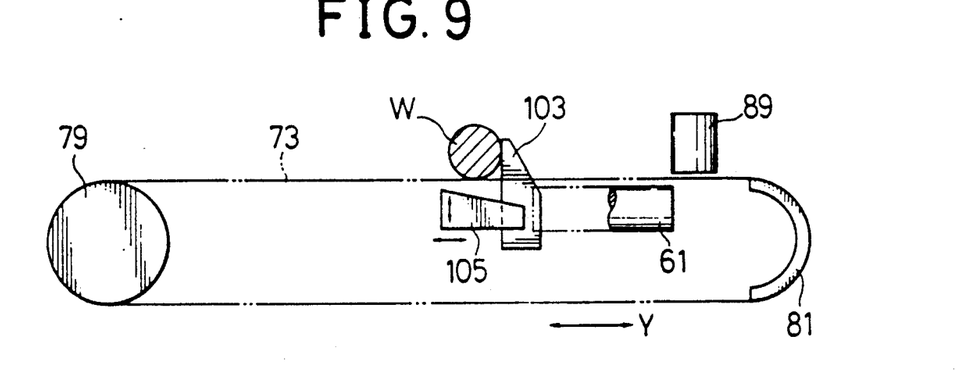
FIG. 9 is an explanatory drawing of a second embodiments of the present invention.

FIG. 9 shows a second embodiment of the present invention. The second embodiment is the same as the first embodiment except for the arrangement for separating a workpiece to be fed to the cutting machine 1, from remaining workpieces loaded on the cross conveyor 15. That is to say, in the second embodiment, as shown in FIG. 9, a stopper 103 is provided for temporarily halting the workpiece W which is transferred to the region of the support roller 61 by the endless chain 73, and a kicker 105, which pushes the workpiece W halted at the stopper 103 upward, is provided in a manner allowing free vertical movement and free position adjustment in the Y-axis direction.

From this configuration, because the workpiece W pushed upward by the kicker 105 gets over the stopper 103, a suitable number of workpieces W are selectively transferred to the support roller 61, In this configuration, it is desirable that the stopper 103 have a configuration allowing vertical movement, and the upper surface of the kicker 105 be inclined.

Figure 10A:
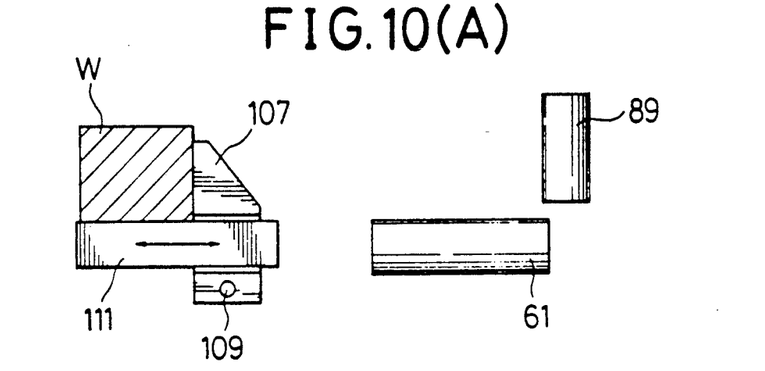
FIG. 10(A) and (B) are explanatory operational drawings of a third embodiment of the present invention.
Figure 10B:
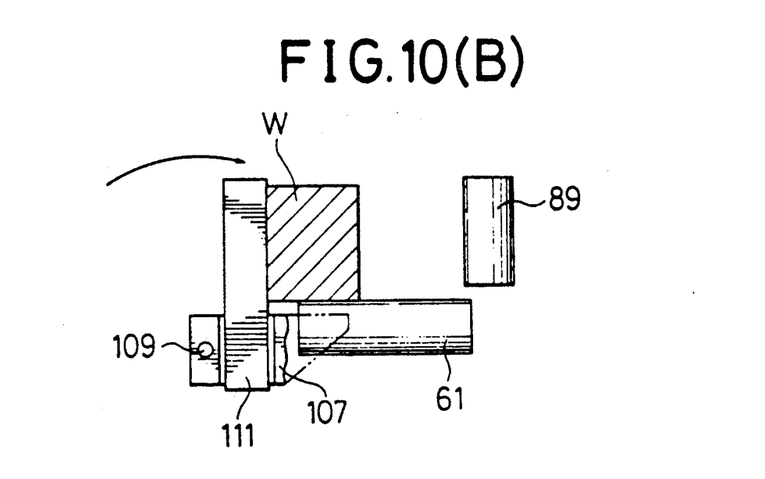

Referring to FIG. 10(A) and FIG. 10(B), in a third embodiment of the present invention, the lower portion of the stopper 107 is supported by means of a hinge pin 109 on the frame 75, and the kicker 111 is provided on the stopper 107 in a freely position-adjustable manner in the Y-axis direction.

In this configuration, the stopper 107 is tipped around the hinge pin 109, so that the workpiece W is raised by the kicker 111 and transferred to the support roller 61, as shown in FIG. 10(B).

In the second and the third embodiments of the present invention, the workpieces W on the cross conveyor 15 and the workpieces W on the feed conveyor 13 can be reliably separated without driving the endless chain 73 in reverse.

Figure 11:
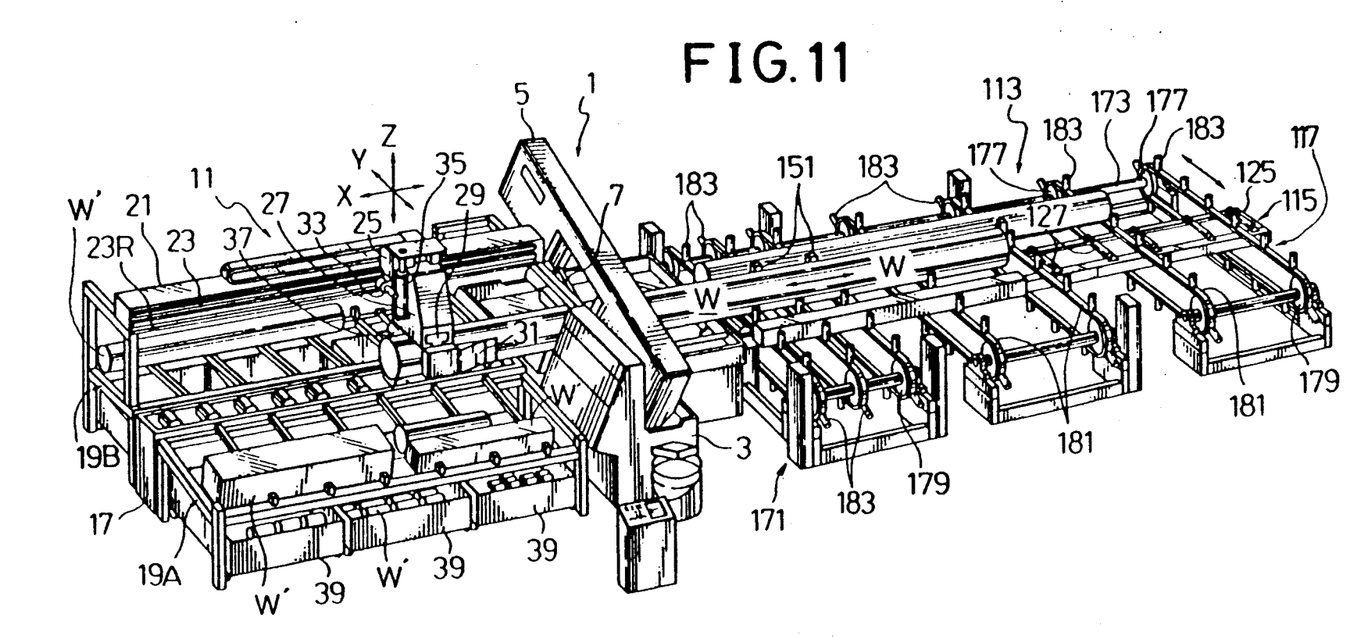
FIG. 11 is a perspective drawing showing a fourth embodiment of the present invention.

FIG. 11 shows a fourth embodiment of the present invention. In the fourth embodiment, the workpiece conveying device 113 comprises a feed conveyor 115 positioned at the rear of the cutting machine 1 and a cross conveyor 117 which crossfeeds the workpiece W to the feed conveyor 115.

Figure 12:
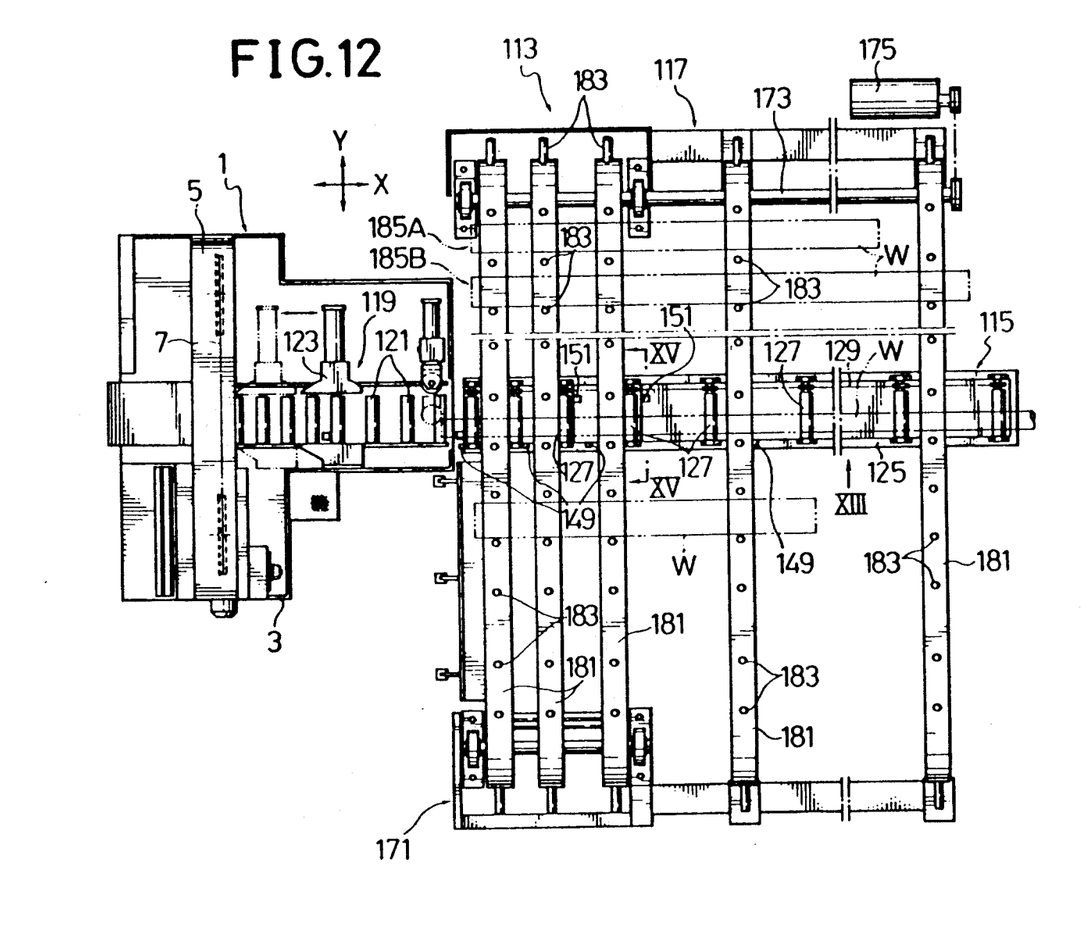
FIG. 12 is a plan drawing showing the main parts of FIG. 11.

Referring to FIG. 12, in this embodiment of the present invention, the feed conveyor 115 performs the actions of conveying the workpiece W to a feed device 119 provided at the rear of the cutting machine 1, and conveying a section of the workpiece which remains after the cutting operation away from the feed device 119.

The feed device 119 comprises a plurality of feed rollers 121 which are rotated forward and in reverse by a drive motor (omitted from the drawings), and a feed vice device 123 capable of reciprocating motion in the feed direction (the X-axis direction), the feed vice clamping the workpieces W being conveyed on the feed rollers 121. A commonly known configuration can be adopted for the feed device 119 so a more detailed explanation will be omitted here.

In the feed conveyor 115, a plurality of support rollers 127 is rotatably supported on a conveyor frame 125 which extends in the X-axis direction. The support rollers 127 are linkingly interconnected through a drive chain 129, and are linkingly connected to a feed motor (omitted from the drawings).

Figure 13:
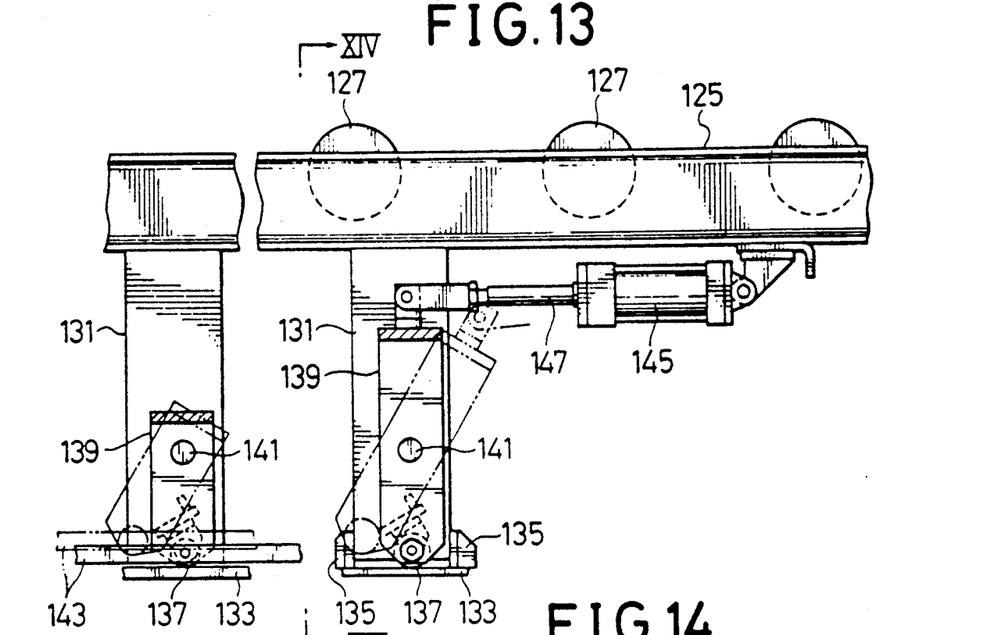
FIG. 13 is an expanded drawing viewed in the direction of the arrow XIII in FIG. 12.

In addition, in this embodiment of the present invention, the conveyor frame 125 is constructed to allow free vertical movement with respect to the cross conveyor 117. Specifically, as shown in detail in FIG. 13 and FIG. 14, leg members 131 for supporting a conveyor frame 125 at a plurality of locations are provided vertically movably between guide brackets 135 erected on base plates 133; horizontal movements of the lower end of each of a plurality of leg members 131 is regulated by a guide bracket 135 so that the leg member 131 is guided to allow free vertical movement only. A swinging lever 139 provided with a roller 137 on its lower end is pivotally mounted through a pivot shaft 141 on the leg member 131. The swinging levers 139 are interconnected through a connecting rod 143. In addition, as shown in FIG. 13, a piston rod 147 of a hydraulic cylinder 145 mounted on the conveyor frame 125 is connected in a pivotally supported manner to a swinging lever 139.

Figure 14:
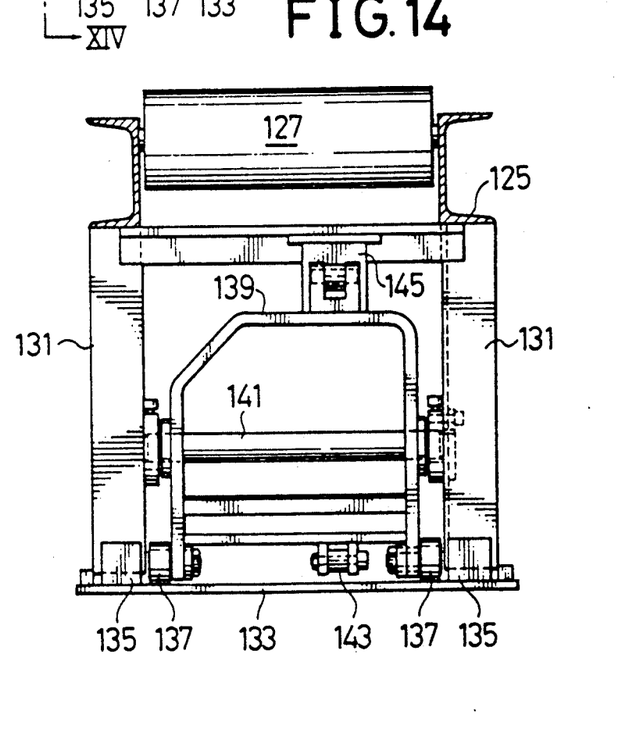
FIG. 14 is a sectional drawing of the section XIV-XIV in FIG. 13.

In this configuration, when the swinging levers 139 are swung by the action of the hydraulic cylinder 145, lower ends of the rollers 137 contact the base plate 133. And, when the swinging levers 139 stand upright, the conveyor frame 125 to be elevated. On the other hand, when the swinging levers 139 are inclined, the conveyor frame 125 descends under its own weight. In short, the feed conveyor 115 can be moved vertically by the action of the hydraulic cylinder 145.

Figure 15:
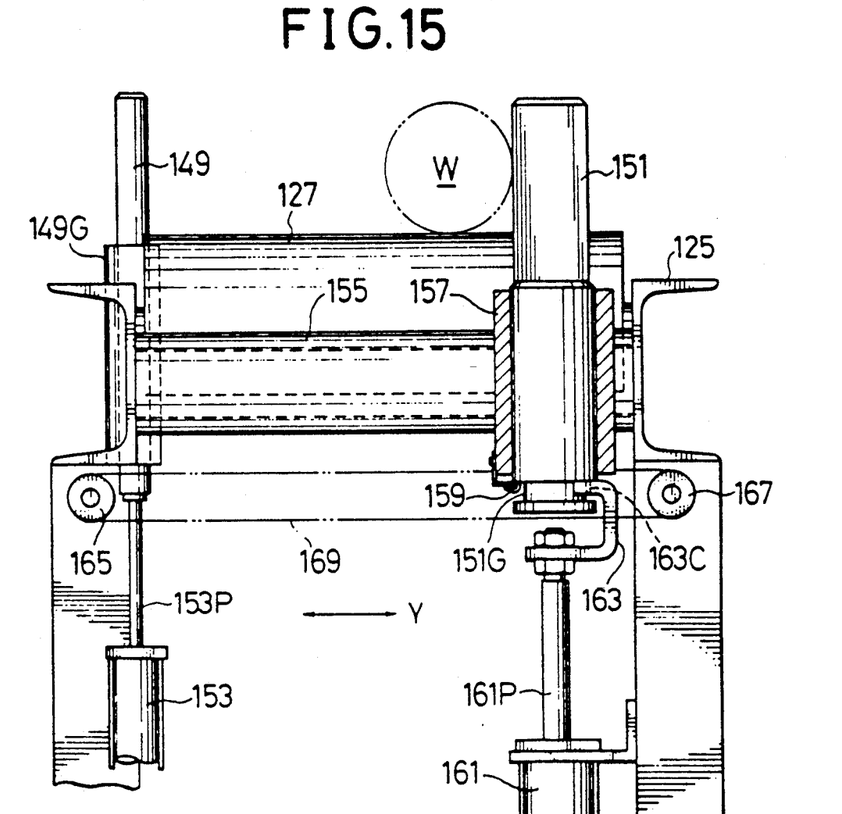
FIG. 15 is an expanded sectional drawing in the direction of the section XV—XV in FIG. 12.

Now referring to FIG. 15 in addition to FIG. 12, on one side of the feed conveyor 115, a base stopper 149 for regulating the crossfeeding transfer of the workpiece W is provided on the conveyor frame 125 in a freely receding and protruding manner with respect to the upper most section of the support roller 127. On the other side of the feed conveyor 115, cross push pin 151 for pressing the workpiece W against the base stopper 149 is provided in a freely receding and protruding manner with respect to the upper most section of the support roller 127, the cross push pin 151 being provided on the feed conveyor 115 in a movable manner in the Y-axis direction.

More specifically, as shown in FIG. 15, a hydraulic cylinder 153 such as an air cylinder is provided on one side of the conveyor frame 125. A piston rod 153P of the hydraulic cylinder 153 and the base stopper 149 are connected. Accordingly, the base stopper 149 moves vertically in a guide member 149G provided on the conveyor frame 125, guided by the action of the hydraulic cylinder 153, and recedes and protrudes with respect to the upper portion of the support roller 127.

Also, a guide member 155 extending the Y-axis direction is provided on the conveyor frame 125, and a slider block 157 is supported in a freely movable manner on the guide member 155. The cross push pin 151 is vertically movably supported on the slider block 157. An elastic engaging leaf 159, such as a plate spring which maintains the cross push pin 151 in an elevated state, is installed on the slider block 157, engaging a peripheral groove 151G formed at the lower section of the cross push pin 151.

On the other side of the conveyor frame 125 from the hydraulic cylinder 153, a hydraulic cylinder 161 is provided to cause the cross push pin 151 to recede and protrude at the top section of the support roller 127. A vertically acting leaf 163 provided with a V-shaped engaging concave section 163C, which can engage and release the peripheral groove 151G in the cross push pin 151, is installed at the upper end of a piston rod 161P provided in the hydraulic cylinder 161. A drive sprocket 165 which is driven by a motor (omitted from the drawing) and a driven sprocket 167 are provided on the conveyor frame 125. A chain 169 which is connected to the slider block 157 is installed to run between the sprockets 165, 167.

In the above configuration, the action of the hydraulic cylinder 161 allows the cross push pin 151 to move vertically to protrude and recede with respect to the top section of the support roller 127 when the engaging concave section 163C of the vertically acting leaf 163 in the peripheral groove 151G is in the engaged state. The chain 169 is driven in the state where the cross push pin 151 is projected upward, and when the slider block 157 is moved toward the base stopper 149, the workpiece W on the support roller 127 is moved in the direction of the base stopper 149 and positioned by the cross push pin 151.

After the workpiece W contacts the base stopper 149 and is positioned, when the slider block 157 returns to its original position, it is possible for the cross push pin 151 to be retracted because the peripheral groove 151G in the cross push pin 151 and the engaging concave section 163C of the vertically acting leaf 163 are once again engaged (when the cross push pin 151 is retracted, the elastic engaging leaf 159 is disengaged from the peripheral groove 151G). Specifically, the vertical movement of the cross push pin can be carried out only at the specified position.

Again referring to FIG. 11 and FIG. 12, a support frame 171 on the cross conveyor 117 extends in the Y-axis direction, crossing the feed conveyor 115. A rotary shaft 173 provided in a freely rotatable manner is linkingly connected to a crossfeed motor 175 on one side of the support frame 171. A plurality of drive rollers 177 is installed on the rotary shaft 173. An endless member 181 such as a chain or a belt is installed to run between each drive roller 177 and each roller of a plurality of driven rollers 179 provided on the opposite side of the support frame 171.

As clearly shown in FIG. 11 and FIG. 12, the endless members 181 extend in the Y-axis direction, crossing the feed conveyor 115, and a large number of divider pins 183 are embedded in the endless members 181, dividing the endless members 181 into a plurality of loading regions 185A, 185B, . . . .

In the above configuration, after a suitable number of workpieces W are loaded into each loading region 185A, 85B, ..., on the endless members 181 positioned at one side of the feed conveyor 115 on the cross conveyor 117, the workpiece W loaded into the loading regions 185A, 185B, ..., can be crossed to the other side of the feed conveyor 115, crossing over the feed conveyor 115, by the operation of the endless member 181.

In this configuration, when the workpieces W have been divided and loaded into the loading regions 185A, 185B, ..., of the endless members 181 on the cross conveyor 117, the base stopper 149 and the cross push pin 151 provided on the feed conveyor 115 are retracted. When the base stopper 149 and the cross push pin are both in the retracted position, the endless members 181 are suitably driven, and the workpieces W are moved to cross over the feed conveyor 115, as previously outlined.

Accordingly, when the desired workpiece W is selectively indexed on the feed conveyor 115, the operation of the endless member 181 is halted. Then, by elevating the feed conveyor 115, the desired workpiece W is supported by the support rollers 127. Subsequently, the base stopper 149 is elevated and projected, and the cross push pin 151 is projected. By moving the cross push pin 151 toward the base stopper 149, as previously outlined, the workpiece W is positioned at the base position of the support rollers 127.

After the workpiece W is positioned at the base position, the workpiece W can be fed to the feed device 119 on the cutting machine 1 by rotating the support rollers 127 in the forward direction. Accordingly, the workpiece W can be fed by the feed device 119 and repeatedly cut to the desired dimensions only.

When a comparatively long remnant has been produced after the workpiece W has been cut in the cutting machine 1, this remnant is returned to the feed conveyor 115 by the feed device 119. Then, by operating the support rollers 127 of the feed conveyor 115 in reverse it is possible to return the remnant to the desired position on the cross conveyor 117. After the remnant has been returned the position on the cross conveyor 117, when the endless member 181 of the cross conveyor 117 has been moved, the remnant is in the original loading region.

Specifically, by this embodiment of the present invention, the desired workpiece W, which have been divided and loaded into the loading regions 185A, 185B, ..., of the endless members 181 on the cross conveyors 117, are indexed and positioned on the feed conveyor 115 and fed to the cutting machine 1. After the cutting operation, the remnant is once again accommodated in the original loading region. Accordingly, the workpieces W can be loaded in a suitable loading region in any order, easily conforming to a multivariety and small number production process.

Figure 16:
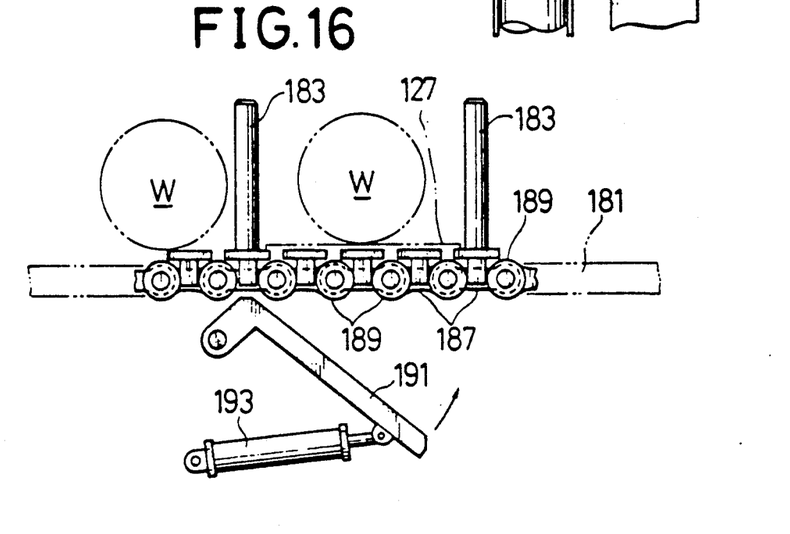
FIG. 16 is an explanatory drawing of a fifth embodiment of the present invention.

FIG. 16 shows the fifth embodiment of the present invention which is the same as the fourth embodiment of the present invention except for the arrangement for selectively transferring a desired workpiece from the cross conveyor 117 to feed conveyor 115 or from the feed conveyor 115 to the cross conveyor 117. That is to say, in the fourth embodiment of the present invention, instead of elevating the feed conveyor 115 relative to the cross conveyor 117, the cross conveyor 117 is lowered relative to the feed conveyor 115. Specifically, as shown in FIG. 16, the endless member 181 is constructed as a chain provided with a plurality of links 187 and rollers 189, the plurality of links 187 pivotally connected to each other; the chain is guided by a cam lever 191 provided on a part of the feed conveyor 115 and passes over the feed conveyor 115. As required, the cam lever 191 can be lowered by the operation of a cylinder 193 to lower the chain so that the workpiece W on the chain is loaded onto the support roller 127.

As can be understood from the above explanation of this embodiment of the present invention, a plurality of workpieces W can be loaded onto the cross conveyor in a mutually contacting state, and can effectively utilize the space on the cross conveyor.

In addition, when the workpieces W are dividedly loaded on the cross conveyor, the desired workpiece can be positionally indexed on the feed conveyor and fed to the cutting machine. Subsequently, the cut remnant can once again be loaded and accommodated in the original region.

What is claimed is:

1. A method for conveying long workpieces to a cutting machine comprising the steps of:

disposing the workpieces laterally in contact with each other on a cross conveyor extending in a direction normal to a path line of the cutting machine;

conveying the workpieces to a feed conveyor positioned in parallel with the path line of the cutting machine by the cross conveyor;

stopping the cross conveyor when a selected workpiece reaches a regulating member provided above the cross conveyor and in a line parallel to the path line of the cutting machine;

moving the position of the feed conveyor in the direction normal to the path line of the cutting machine in response to the width of the selected workpiece so that a side end of the feed conveyor is aligned with one side of the selected workpiece;

moving at least one of the feed conveyor and a part of the cross conveyor in the vertical direction so that the selected workpiece is loaded on the feed conveyor; and conveying the selected workpiece to the cutting machine by the feed conveyor.

2. The method for conveying long workpieces of claim 1, further including the step of reversing the cross conveyor to separate the selected workpiece from the workpieces disposed on the cross conveyor.

3. A method for conveying long workpieces to a cutting machine comprising the steps of:

disposing long workpieces laterally in contact with each other on a cross conveyor extending in a direction normal to a path line of the cutting machine;

conveying the workpieces to a feed conveyor positioned in parallel with the path line of the cutting machine;

halting the workpieces when a selected workpiece reaches a stopper member provided above the cross conveyor;

transferring the selected workpiece to a region provided on a cross conveyor by a movement of the stopper member;

regulating the position of the selected workpiece by a regulating member provided above the cross conveyor so that the selected workpiece is restricted in the region under which the feed conveyor is positioned;

moving at least one of a feed conveyor or a part of the cross conveyor in the vertical direction so that the selected workpiece is loaded on the feed conveyor; and conveying the selected workpiece to the cutting machine by the feed conveyor.

4. A workpiece conveying device for conveying long workpieces to a cutting machine, comprising:

a cross conveyor extending in a direction normal to a path line of the cutting machine, adapted for loading the workpieces disposed laterally in contact with each other so as to carry the workpieces toward the path line of the cutting machine;

a regulating member adapted to regulating the position of a selected workpiece in alignment with the path line of the cutting machine;

a feed conveyor disposed parallel to the path line of the cutting machine, adapted for conveying the selected workpiece to the cutting machine; and a threaded bar member adapted for adjusting the position of the feed conveyor in the lateral direction so as to align a side end of the feed conveyor with one side of the selected workpiece.

5. A workpiece conveying device of claim 4, wherein the cross conveyor is adapted to be reversibly driven for separating the selected workpiece from the workpieces loaded on the cross conveyor.

6. The workpiece conveying device of claim 4, further including a vertical operation device adapted for moving at least one of the fed conveyor or a part of the cross conveyor in the vertical direction wherein the vertical operation device includes a lever member rotatable around a pin on the feed conveyor and a guide member adapted for guiding the vertical movement of the feed conveyor.

7. The workpiece conveying device of claim 5, further including a vertical operation device adapted for moving at least one of the feed conveyor or a part of the cross conveyor in the vertical direction wherein the vertical operation device includes a lever member rotatable around a pin on the feed conveyor and a guide member adapted for guiding the vertical movement of the feed conveyor.

8. A workpiece conveying device for conveying long workpieces to a cutting machine, comprising:

a cross conveyor extending in a direction normal to a path line of the cutting machine, adapted for loading the workpieces disposed laterally in contact with each other so as to carry the workpieces toward the path line of the cutting machine;

a stopper member projected above the cross conveyor, adapted for temporarily halting a selected workpiece within a region in alignment with the path line of the cutting machine;

a regulating member adapted for regulating the position of the selected workpiece transferred from the stopper member within the region in alignment with the path line of the cutting machine;

a feed conveyor disposed parallel to the path line of the cutting machine, adapted for conveying the selected workpiece to the cutting machine; and a vertical operation device adapted for moving at least one of the feed conveyor or a part of the cross conveyor in the vertical direction.

9. The workpiece conveying device of claim 8, wherein the stopper member is provided with an arm freely extendable in response to the sectional dimension of the selected workpiece.

10. The workpiece conveying device of claim 8, wherein the vertical operation device includes a lever member rotatable around a pin on the feed conveyor and a guide member adapted for guiding the vertical movement of the feed conveyor.

11. The workpiece conveying device of claim 9, wherein the vertical operation device includes a lever member rotatable around a pin on the feed conveyor and a guide member adapted for guiding the vertical movement of the feed conveyor.

12. A workpiece conveying device for conveying long workpieces to a cutting machine, comprising:

a cross conveyor extending in a direction normal to a path line of the cutting machine and being capable of being driven reversibly, adapted for conveying the workpieces disposed laterally thereon to the path line of the cutting machine, said cross conveyor having a plurality of compartments so that the workpieces are disposed one on each of the compartments;

a feed conveyor crossing normal to the cross conveyor and being positioned in parallel with the line of the cutting machine, adapted for conveying a selected workpiece to the cutting machine, said feed conveyor having;

a base stopper retractably projected at a lateral side of the feed conveyor, adapted for regulating the selected workpiece;

a cross push pin retractably projected at another lateral side of the feed conveyor and being movable toward and away from the base stopper, adapted for moving the selected workpiece toward the base stopper so that the selected workpiece placed between the base stopper and the cross push pin is aligned with the path line of the cutting machine; and a vertical operation device for moving the feed conveyor in the vertical direction so as to transfer the selected workpiece from the cross conveyor to the feed conveyor.

* * * * *